(12) United States Patent
Schiegl et al.

(10) Patent No.: US 8,883,370 B2
(45) Date of Patent: Nov. 11, 2014

(54) FUEL CELL SYSTEM OPERATED WITH LIQUID GAS

(75) Inventors: Andreas Schiegl, Oberhaching (DE); Reinhard Frank, München (DE)

(73) Assignee: Truma Gerätetechnik GmbH & Co. KG, Putzbrunn (DE)

( * ) Notice: Subject to any disclaimer, the term of this patent is extended or adjusted under 35 U.S.C. 154(b) by 827 days.

(21) Appl. No.: 12/451,514

(22) PCT Filed: May 25, 2007

(86) PCT No.: PCT/EP2007/004686
§ 371 (c)(1),
(2), (4) Date: Nov. 16, 2009

(87) PCT Pub. No.: WO2008/145148
PCT Pub. Date: Dec. 4, 2008

(65) Prior Publication Data
US 2010/0124680 A1  May 20, 2010

(51) Int. Cl.
| | |
|---|---|
| *H01M 8/22* | (2006.01) |
| *H01M 2/38* | (2006.01) |
| *H01M 8/02* | (2006.01) |
| *H01M 8/04* | (2006.01) |
| *H01M 8/10* | (2006.01) |
| *C01B 3/38* | (2006.01) |

(52) U.S. Cl.
CPC ........ *H01M 8/04022* (2013.01); *H01M 8/0291* (2013.01); *H01M 8/04291* (2013.01); *H01M 8/04231* (2013.01); *H01M 8/1048* (2013.01); *Y02B 90/12* (2013.01); *C01B 2203/067* (2013.01); *C01B 3/38* (2013.01); *H01M 8/04097* (2013.01); *Y02E 60/521* (2013.01); *H01M 2250/402* (2013.01); *H01M 8/04059* (2013.01); *C01B 2203/0233* (2013.01); *H01M 8/04141* (2013.01); *Y02T 90/32* (2013.01); *H01M 8/103* (2013.01); *H01M 2250/20* (2013.01)

USPC ............ 429/502; 429/505; 429/462; 429/492

(58) Field of Classification Search
CPC ..................... H01M 8/04022; H01M 8/04097; H01M 8/0291; H01M 8/01803; H01M 8/04291; H01M 8/04059; H01M 8/04231; H01M 8/0414
USPC .................................. 429/502, 505, 462, 492
See application file for complete search history.

(56) References Cited

U.S. PATENT DOCUMENTS

| 3,488,226 A | * | 1/1970 | Baker et al. | .................... 429/425 |
|---|---|---|---|---|
| 5,302,470 A | * | 4/1994 | Okada et al. | ................... 429/410 |

(Continued)

FOREIGN PATENT DOCUMENTS

| DE | 103 28 960 | 2/2005 |
|---|---|---|
| EP | 1439082 | 7/2004 |

(Continued)

OTHER PUBLICATIONS

Mehta, V., et al.; "Review and Analysis of PEM Fuel Cell Design and Manufacturing;" *Journal of Power Sources*; vol. 14, No. 1, pp. 32-53 (Feb. 25, 2003).

(Continued)

*Primary Examiner* — Helen O Conley
(74) *Attorney, Agent, or Firm* — D. Peter Hochberg; Sean F. Mellino; Richard A. Wolf

(57) ABSTRACT

A fuel cell system comprises at least one fuel cell with a high-temperature polymer electrolyte membrane. The fuel cell is supplied with liquefied petroleum gas from a supply of liquefied petroleum gas. The liquefied petroleum gas can be directly fed into an anode reaction chamber of the fuel cell without complex reforming. Water vapor is admixed to the liquefied petroleum gas before it enters the anode reaction chamber.

13 Claims, 2 Drawing Sheets

(56) References Cited

U.S. PATENT DOCUMENTS

| | | |
|---|---|---|
| 2002/0160239 A1 | 10/2002 | Cutright et al. |
| 2002/0182458 A1 | 12/2002 | Ingraham et al. |
| 2005/0136304 A1 | 6/2005 | Pettit et al. |

FOREIGN PATENT DOCUMENTS

| | | |
|---|---|---|
| EP | 1881056 A1 | 1/2008 |
| JP | H 7-230846 A | 8/1995 |
| JP | 2004360709 A | 12/2004 |
| JP | 2005-166486 A | 6/2005 |
| JP | 2006-261120 A | 9/2006 |
| JP | 2006-318721 A | 11/2006 |
| JP | 2006-339119 A | 12/2006 |
| WO | WO 01/48846 | 7/2001 |
| WO | WO 2004/004052 A2 | 1/2004 |
| WO | WO 2007/031082 | 3/2007 |

OTHER PUBLICATIONS

Office action in corresponding CN application No. 200780052332 dated Apr. 16, 2012 (and English translation thereof), citing JP2005-166486 and JPH7-230846A which were made of record in the present application via the Information Disclosure Statement filed on Oct. 28, 2011.

Office action in corresponding CN application No. 200780052332.2. citing the JP publications.

Office action dated Jan. 23, 2013 in corresponding CN application, and English translation.

Office action in corresponding CN application No. 200780052332 dated Jul. 23, 2012 (and English translation thereof).

Office action dated Aug. 28, 2013 in corresponding EP patent application No. 07725582.6-1360. Concise explanation (in English).

\* cited by examiner

FUEL CELL SYSTEM OPERATED WITH LIQUID GAS

CROSS-REFERENCE TO RELATED APPLICATIONS

This application is a National Stage application of International Application No. PCT/EP2007/004686, filed on May 25, 2007, which is incorporated herein by reference in their entireties.

BACKGROUND OF THE INVENTION

1. Field of the Invention

The invention relates to a fuel cell system which can be operated with liquefied petroleum gas.

2. Description of the Prior Art

Fuel cells require hydrogen and (atmospheric) oxygen as reactants for the generation of electrical and thermal energy. There are different known reforming methods, such as steam reforming, autothermal reforming, partial oxidation or cracking, wherein gas which contains hydrogen is generated by the conversion of gaseous and liquid hydrocarbons. In most cases, these methods are highly complex and require a high complexity in terms of apparatuses and technical control systems. Usually, they comprise a multitude of single components, such as reforming reactors, shift stages, gas fine-cleaning stages, heat exchangers, and vaporizers.

Furthermore, there are known high-temperature solid oxide fuel cells (SOFC) and molten carbonate fuel cells (MCFC) wherein gaseous and liquid hydrocarbons are turned into electrical energy at temperatures ranging from 600° C. to 1000° C. and under addition of (atmospheric) oxygen, this being achieved directly or with what is called a pre-reforming stage being connected ahead. The disadvantages of these systems are a low thermal cyclability, long heating and cooling times as well as very high requirements for the materials used.

Fuel cell systems have also, for some time, been used as APU systems (auxiliary power unit) for the supply of recreational vehicles with onboard power. It is also known to use such fuel cell systems as electric generators or cogeneration systems for decentralized energy supply.

US 2002/0182458 A1 describes a fuel cell system wherein it is also possible to supply propane as fuel in addition to other fuels. The fuel is processed in a reformer which is designed as an autothermal reactor and is converted into a hydrogen-containing reformate gas. The reformate gas is then supplied into an anode reaction chamber of the fuel cell via a heat exchanger.

SUMMARY OF THE PRESENT INVENTION

The invention aims at presenting a fuel cell system which allows directly turning a fuel into electrical energy without having to face a high complexity in terms of apparatuses for reforming the fuel.

The problem is solved by the invention by means of a fuel cell system in accordance with the present invention. Furthermore, advantageous use of the fuel cell system according to the invention as well as methods for starting and stopping a fuel cell or fuel cell system are presented.

A fuel cell system according to the invention comprises a fuel cell with a high-temperature polymer electrolyte membrane (HT-PEM), a supply of liquefied petroleum gas as well as a liquefied petroleum gas supply line for feeding the liquefied petroleum gas from the supply of liquefied petroleum gas into an anode reaction chamber of the fuel cell.

Hence, a fuel cell is presented which allows directly turning gaseous liquefied petroleum gas into electrical energy without a high complexity in terms of apparatuses and at moderate operating temperatures. The use of polymer electrolyte membrane fuel cells allows achieving a high start-stop cyclability. Short start and stop times as well as lower material requirements due to reduced operating temperatures are, likewise, advantageous.

The fuel cell can consist of a single fuel cell or of a multitude of single fuel cells which are arranged in the form of a stack. The basic structure of a fuel cell is known and, therefore, does not need to be illustrated in more detail at this point. The fuel cell can be operated under pressure or under approximately atmospheric conditions. In the latter case, the energy requirements of the peripheral systems (air and gas pumps) are considerably reduced. The structure is achieved by means of materials which meet the temperature requirements, for example by means of bipolar plates made of metal or carbon-plastic composite materials.

The liquefied petroleum gas is directly supplied into the anode reaction chamber where it can be turned into electrical energy, this being achieved without any complex reforming process. It may, perhaps, only be necessary to provide a desulfurization device between the supply of liquefied petroleum gas and the fuel cell to desulfurize the supplied liquefied petroleum gas. A separation of odorants can also be carried out there.

Propane, butane or a mixture of propane and butane can be used as liquefied petroleum gas.

Water vapor can be admixed to the liquefied petroleum gas stream before it enters the anode reaction chamber. The admixture of water vapor can be to advantage, but it is not absolutely necessary, depending on the embodiment of the fuel cell system. A catalyst provided in the anode reaction chamber, for example on or in a gas diffusion electrode, is suitable for converting the liquefied petroleum gas and for generating hydrogen ions, among other things.

The conversion of the hydrogen content into electrical and thermal energy and water as reaction product takes place in the known electrochemical fuel cell reaction with (atmospheric) oxygen being supplied into the cathode reaction chamber. It has turned out that the current and/or voltage yield is dependent on the operating temperature. The higher the temperature value, the more current can be delivered by the fuel cell at a constant operating voltage.

The high-temperature polymer electrolyte membrane is operated within a temperature range from room temperature to over 300° C., preferably within a range from 150° C. to 250° C. It separates the anode reaction chamber from a cathode reaction chamber of the fuel cell, to which ambient air or oxygen can be supplied.

Phosphoric-acid-doped PBI (polybenzimidazole) polymer membranes are primarily used as materials for the HT-PEM. However, other plastic materials which, within this temperature range, have a high thermal stability and are proton-conducting or can be made proton-conductive by appropriate additions/doping are also suitable.

At least on the side facing the anode reaction chamber, the HT-PEM comprises a catalyst layer which carries a catalyst that allows decomposition of the liquefied petroleum gas into hydrogen or hydrogen ions and further components, with or without the addition of water vapor. Any types of noble and base metals which, under addition of water vapor, allow this decomposition of the liquefied petroleum gas into hydrogen or hydrogen ions, carbon dioxide, carbon monoxide or shorter-chain hydrocarbons can be used as catalysts. For example, catalysts containing platinum are appropriate. Further conceivable materials are, for example, Pd, Ru, Fe, Ni, Au, Ag, Rh, Ir Co, W, Mo, Ce, Cu, Zn, Al, Zr or alloys thereof with or without Pt.

The liquefied petroleum gas streaming into the anode reaction chamber can be mixed with water vapor beforehand. To achieve this, a vaporizing device for vaporizing water, a water vapor supply line for discharging the water vapor from the vaporizing device and a mixing site positioned upstream of the anode reaction chamber can be provided, wherein the water vapor supply line and the liquefied petroleum gas supply line are coupled at the mixing site and the water vapor streaming in from the vaporizing device can be mixed with the liquefied petroleum gas at said mixing site.

The water vapor which is admixed to the liquefied petroleum gas before it enters the anode reaction chamber is, thus, generated in the vaporizing device.

An additional heating device can be provided for heating the fuel cell, wherein the additional heating device can be a device separate from the fuel cell or directly integrated into the fuel cell. The additional heating device serves to bring the fuel cell to an appropriate temperature for starting the system. Likewise, the additional heating device can also be used during operation to maintain the fuel cell at the required operating temperature.

Liquefied petroleum gas can be directly supplied from the supply of liquefied petroleum gas as fuel for the additional heating device as well as for the vaporizing device.

As a supplement or as an alternative, it is also possible to provide an anode off-gas return to carry anode off-gas exiting from the anode reaction chamber of the fuel cell. The anode off-gas contains a mixture of carbon dioxide, carbon monoxide, water vapor and non-utilized hydrogen and/or non-converted liquefied petroleum gas. This means that the anode off-gas still contains substances that are still thermally utilizable or combustible, substances which can, for example, be utilized in the additional heating device or in the vaporizing device.

To achieve this, the anode off-gas return can be supplied to a burner provided at the vaporizing device and/or to the additional heating device where the combustible substances that are still present (hydrogen, liquefied petroleum gas, carbon monoxide, short-chain hydrocarbons) can be burned.

Via the anode off-gas return, the anode off-gas can, likewise, also be resupplied to an anode input side of the fuel cell where it is refed into the anode reaction chamber—if necessary after water vapor has been re-admixed. The liquefied petroleum gas that has not been utilized yet and the water vapor can, thus, be repeatedly supplied through the fuel cell, in order to finally and completely convert at least the liquefied petroleum gas.

As has already been stated above, the burner of the vaporizing device and/or the additional heating device can, as a supplement or as an alternative, also be directly supplied with liquefied petroleum gas from the supply of liquefied petroleum gas.

The fuel cell system according to the invention can be used in a vehicle, for example in a recreational vehicle, such as a travel trailer or a caravan, wherein the additional heating device of the fuel cell is, at the same time, also an integral part of a heating device for heating an interior of the vehicle.

Like the additional heating device, the heating device can, accordingly, be operated with liquefied petroleum gas.

It is, thus, also possible to use a liquefied petroleum gas heater which is known as such, in particular in recreational vehicles, simultaneously as an additional heating device for the fuel cell. In this case, an independent additional heating device is not required for the fuel cell.

A preferred field of application of the system within an electric power range from a few watts to several kilowatts is the use as an APU system for the onboard power supply in recreational vehicles as well as the use as an independent electric generator or cogeneration system for decentralized energy supply.

A method for operating a fuel cell system includes the fuel cell as a high-temperature polymer electrolyte membrane fuel cell and that an anode reaction chamber of the fuel cell is fed with liquefied petroleum gas, in particular with a mixture of liquefied petroleum gas and water vapor. Apart from a desulfurization which has to be carried out beforehand if necessary, the liquefied petroleum gas is fed into the fuel cell directly from the supply of liquefied petroleum gas. Separate reforming of the fuel in a separate reforming unit is, therefore, not necessary.

A method for starting an HT-PEM fuel cell system is comprises the steps of:
- supplying liquefied petroleum gas to the fuel cell;
- supplying the liquefied petroleum gas through an anode reaction chamber of the fuel cell;
- supplying the liquefied petroleum gas and/or anode off-gas exiting from the anode reaction chamber to an additional heating device provided at or in the fuel cell and/or to a vaporizing device;
- heating the fuel cell through the additional heating device and/or heating the vaporizing device for generating water vapor by means of the liquefied petroleum gas and/or anode off-gas;
- supplying the water vapor to the liquefied petroleum gas supplied to the fuel cell and mixing the water vapor with the liquefied petroleum gas;
- supplying the mixture of water vapor and liquefied petroleum gas to the anode reaction chamber;
- supplying air to a cathode reaction chamber of the fuel cell;
- applying an electric load for operating the fuel cell.

According to this method, the liquefied petroleum gas is directed through the HT-PEM fuel cell and burned in the additional heating device as well as in the vaporizing device while air is being supplied. The fuel cell is brought to operating temperature by means of the exhaust heat of the additional heating device. At the same time, the vaporizing device is heated up. As soon as water is vaporized by the vaporizing device, the developing water vapor is admixed to the liquefied petroleum gas supplied to the fuel cell and is fed into the anode reaction chamber of the fuel cell. On the cathode side, air is, at the same time, supplied to the fuel cell heated by the additional heating device, in order to initiate the electrochemical reaction with the mixture of liquefied petroleum gas and water vapor if there is a load request to the fuel cell.

According to this method, the media streams do not have to be reversed. It is, rather, possible to continually supply in particular the stream of liquefied petroleum gas through the fuel cell. The liquefied petroleum gas and/or anode off-gas exiting from the fuel cell is burned by the vaporizing device and the additional heating device, so that liquefied petroleum gas cannot leave the fuel cell system.

According to another method for starting the HT-PEM fuel cell system, the liquefied petroleum gas is directly supplied from the supply of liquefied petroleum gas to the additional heating device and/or to the vaporizing device, on the one hand to heat up the fuel cell and, on the other hand, to generate water vapor through the vaporizing device. Once the fuel cell has reached a specified temperature, the liquefied petroleum gas is also directly supplied from the supply of liquefied petroleum gas into the anode reaction chamber of the fuel cell. Therein, water vapor from the vaporizing device can be admixed. If there is a load request to the fuel cell, the electrochemical reaction is initiated.

Depending on the design of the system, liquefied petroleum gas can either continue to be directly supplied to the additional heating device and the vaporizing device during operation of the fuel cell, in order to provide the heating energy required. Or, it is likewise possible to interrupt the direct supply and, instead, to supply the anode off-gas exiting from the fuel cell to the additional heating device and the vaporizing device. Usually, the anode off-gas still contains a sufficient amount of combustible materials (liquefied petroleum gas, hydrogen, carbon monoxide, short-chain hydrocarbons) and can, therefore, be used as fuel.

A method for stopping a fuel cell system according to the invention comprises the steps of:
  interrupting the supply of liquefied petroleum gas;
  continuing to supply anode off-gas exiting from an anode reaction chamber of the fuel cell to a vaporizing device for generating water vapor;
  supplying the water vapor into the anode reaction chamber.

After the supply of liquefied petroleum gas has been interrupted, the gas mixture still present in the system (residual hydrogen, carbon dioxide, carbon monoxide or shorter-chain hydrocarbons as well as water vapor) is thermally utilized in the vaporizing device, whereby water vapor is continues to be generated. The water vapor that is still supplied to the fuel cell displaces the residual gas mixture from the system. As soon as the electrochemical reaction in the fuel cell and, subsequently, the burning process in the burners of the vaporizing device and the additional heating device come to a standstill, the gas-carrying lines and the fuel cell can be rinsed with air or in an inert gas and the system be cooled.

DETAILED DESCRIPTION OF THE PRESENT INVENTION

Figure 1:
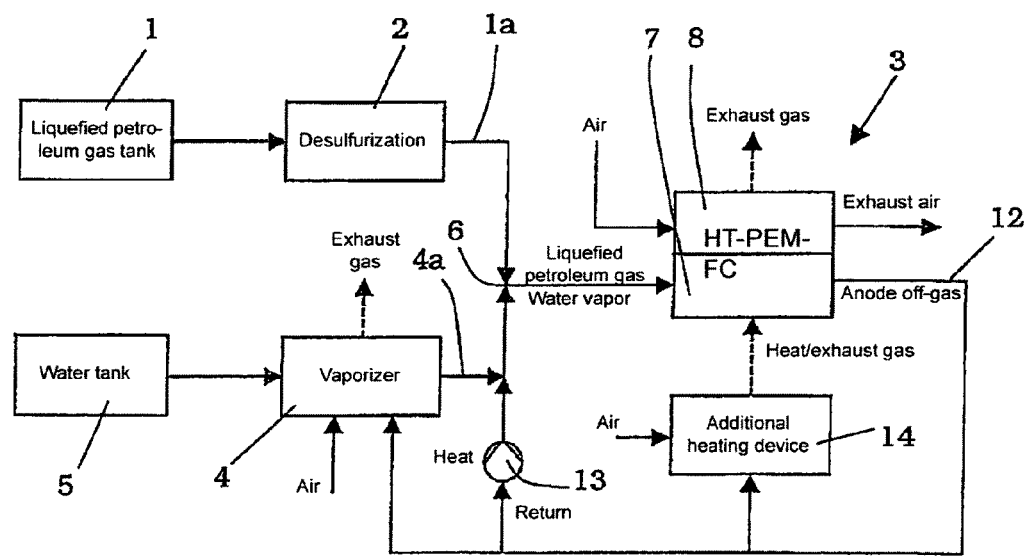
FIG. 1 shows a schematic diagram of a fuel cell system according to the invention.

FIG. 1 shows a schematic diagram of the layout of the fuel cell system.

A liquid tank 1 serving as liquid supply, for example a gas bottle or a reservoir, contains liquefied petroleum gas, such as propane, butane or a mixture thereof.

The liquefied petroleum gas is removed from the liquefied petroleum gas tank 1 and supplied through a desulfurization device 2. In the latter, odorants and other sulfur compounds contained in the liquefied petroleum gas are separated.

Thereafter, the desulfurized liquefied petroleum gas is fed into a fuel cell 3 via a liquefied petroleum gas supply line 1a. The fuel cell 3 is what is called a high-temperature polymer electrolyte membrane fuel cell (HT-PEM FC) which is operated within a temperature range from room temperature to over 300° C., preferably within a range from 150° C. to 250° C. Although the structure of the fuel cell 3 is known as such, it will still be illustrated in more detail by means of FIG. 2 below.

Furthermore, a vaporizing device 4 is provided, which vaporizes water supplied from a water tank 5. Subsequently, the water vapor generated by the vaporizing device 4 is also supplied to the fuel cell 3 via a water vapor supply line 4a and mixed with the liquefied petroleum gas at a mixing site 6 before it enters the fuel cell 3. In this manner, a mixture of liquefied petroleum gas and water vapor enters the fuel cell 3 during operation.

Figure 2:
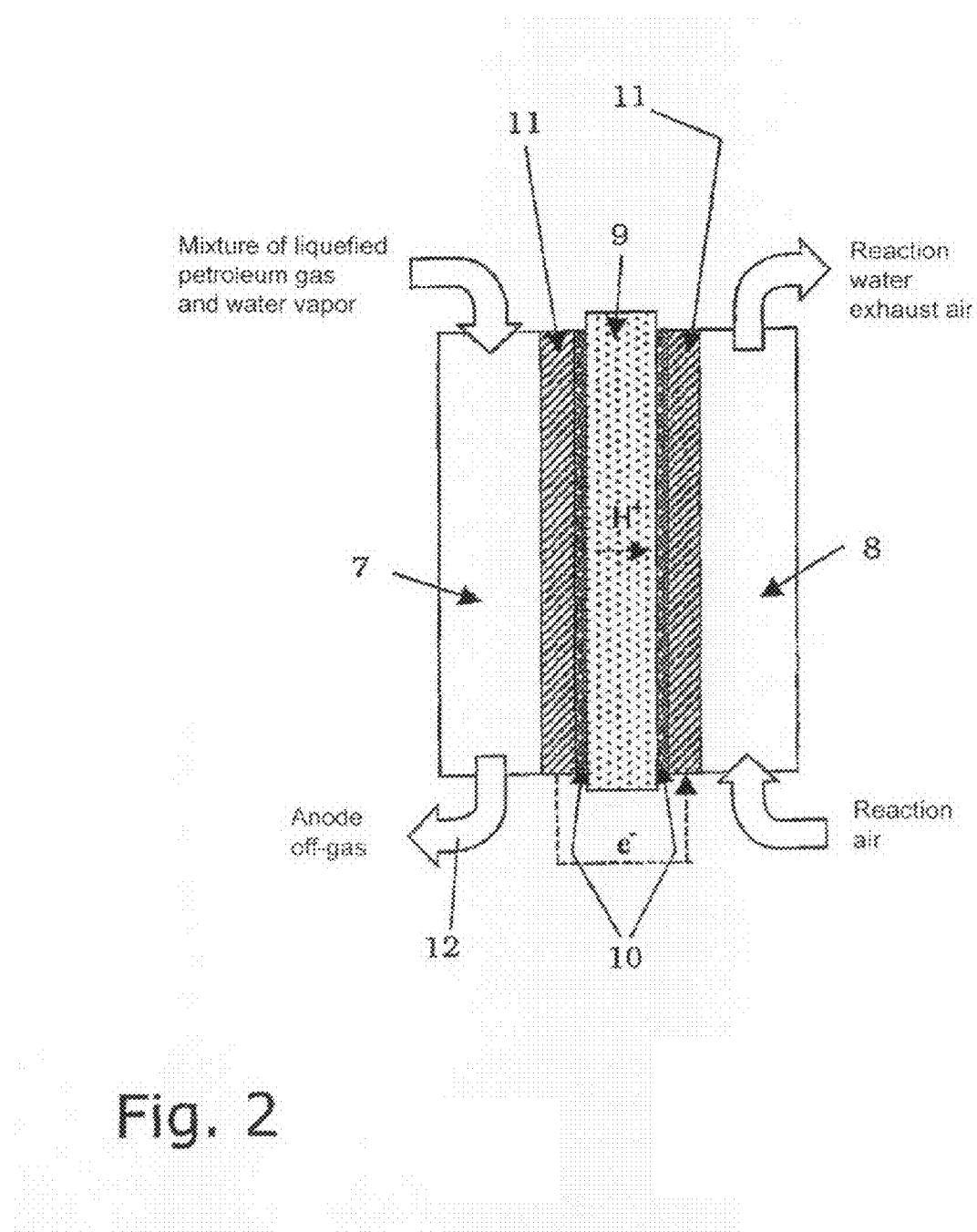
FIG. 2 shows a schematic diagram of the structure of a high-temperature polymer electrolyte membrane fuel cell used in the fuel cell system.

FIG. 2 shows a schematic diagram of the structure of the fuel cell 4.

A high-temperature polymer electrolyte membrane 9 is arranged between an anode reaction chamber 7 and a cathode reaction chamber 8. Phosphoric-acid-doped PBI (polybenzimidazole) polymer membranes are primarily used as material for the membrane 9. However, other plastic materials which, within this temperature range, have a high thermal stability, are proton-conducting or can be made proton-conductive by appropriate additions/doping are also suitable.

A catalyst layer 10 is applied onto the membrane 9 on either side thereof. Various types of noble and base metals, such as they have already been described above, can be used as catalysts.

Gas diffusion electrodes 11 are arranged over each of the catalyst layers 10 in a known manner.

The catalyst layers 10, or the catalysts as such, can also be integrated in the gas diffusion electrodes 11. Therein, the structure on the anode side, on the one hand, can also differ from that on the cathode side, on the other hand. For example, it is also possible to use different materials on the two sides. The structure shown in FIG. 2, thus, only serves to illustrate an example and should not be considered as limiting.

The mixture of liquefied petroleum gas and water vapor is supplied to the anode reaction chamber 7. On the other hand, reaction air is fed into the cathode reaction chamber 8.

The media stream leaving the anode reaction chamber 7 is referred to as anode off-gas stream and can comprise a mixture of carbon dioxide, carbon monoxide, water vapor, non-utilized hydrogen and non-converted liquefied petroleum gas. On the cathode side, a mixture of exhaust air and reaction water exits from the cathode reaction chamber 8 in the form of water vapor.

The fuel cell 3 can consist of a single cell or of a system comprising a plurality of single cells, in particular a fuel cell stack. As a matter of course, the mixture of liquefied petroleum gas and hydrogen must be supplied to all single cells of a fuel cell stack if necessary.

As shown in FIG. 1, the anode off-gas stream 12 from the fuel cell 3 can be further used in a plurality of manners.

On the one hand, the anode off-gas stream 12 can be returned into the anode inlet of the fuel cell 3 via a return unit 13, for example a pump. Therein, fresh water vapor and/or further liquefied petroleum gas can be admixed. In this manner, the liquefied petroleum gas can be repeatedly supplied through the fuel cell 3, in order to also gradually use up liquefied petroleum gas that has not been utilized yet.

Likewise, it is possible to use the anode off-gas stream as fuel for providing heat in the vaporizing device 4. Usually, the combustible components of the anode off-gas suffice to provide enough thermal energy for the generation of the water vapor.

Furthermore, it is possible to also supply an additional heating device 14 with the anode off-gas stream 12 as fuel. The fuel cell 3 is maintained at operating temperature or is preheated to a specific temperature for starting purposes by means of the additional heating device 14. The additional heating device 14 can be designed both as a separate component and as an integrated part of the fuel cell 3. The combustion reaction can be achieved catalytically or on a conventional basis.

The mixing site 6 can be spatially arranged upstream of the fuel cell 3. Likewise, it is possible to provide the mixing site 6 in the fuel cell 3, however still upstream of the anode reaction chamber 7. Therein, it is only necessary to ensure that a mixture of liquefied petroleum gas and water vapor can be fed into the anode reaction chamber 7. If necessary, it is also possible to additionally admix anode off-gas to this mixture—as has been described above.

The system is completed by a condenser device (not shown) in which the water contained in the exhaust air and exhaust gas streams is recovered and supplied to the water reservoir or water tank 5. The figures neither show fans and/or pumps for air, gas and water supply as well as, if necessary, a cooling fan for the fuel cell 3 and various electrical subsystems, such as voltage transformers for feeding the current generated by the fuel cell 3 into a battery. A higher-order system control comprising the appropriate technical measuring, controlling and regulating units is, likewise, not shown in the figures either.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

The invention claimed is:

1. A fuel cell system, comprising
   a supply of liquefied petroleum gas;
   a fuel cell with a high-temperature polymer electrolyte membrane, said fuel cell having an anode reaction chamber, wherein said high-temperature polymer electrolyte membrane comprises:
   a surface;
   a catalyst layer on said surface and facing the anode reaction chamber, said catalyst layer comprising a liquefied petroleum gas decomposing catalyst configured to decompose the liquefied petroleum gas into hydrogen or hydrogen ions and further components; and
   a liquefied petroleum gas supply line for feeding the liquefied petroleum gas from the supply of liquefied petroleum gas directly into said anode reaction chamber of the fuel cell.

2. The fuel cell system according to claim 1, wherein the liquefied petroleum gas is selected from the group consisting of propane, butane and a mixture of propane and butane.

3. The fuel cell system according to claim 1, further comprising a desulfurization device for desulfurizing the supplied liquefied petroleum gas, wherein said desulfurization device is provided in the liquefied petroleum gas supply line between the supply of liquefied petroleum gas and the fuel cell.

4. The fuel cell system according to claim 1, wherein said fuel cell further comprises a cathode reaction chamber to which ambient air or oxygen can be supplied.

5. The fuel cell system according to claim 1, wherein the high-temperature polymer electrolyte membrane is operated within a temperature range from 150° C. to 250° C.

6. The fuel cell system according to claim 1, wherein, with addition of water vapor, the liquefied petroleum gas decomposing catalyst serves for the decomposition of the liquefied petroleum gas into hydrogen or hydrogen ions and further components.

7. The fuel cell system according to claim 1, further comprising:
   a vaporizing device for vaporizing water;
   a water vapor supply line for discharging the water vapor from the vaporizing device; and
   a mixing site positioned upstream of the anode reaction chamber, wherein the water vapor supply line and the liquefied petroleum gas supply line are coupled at said mixing site and the water vapor streaming in from the vaporizing device is mixed with the liquefied petroleum gas at said mixing site.

8. The fuel cell system according to claim 1, further comprising an additional heating device for heating the fuel cell, wherein the additional heating device is a device separate from the fuel cell or directly integrated into the fuel cell.

9. The fuel cell system according to claim 1, further comprising an anode off-gas return for carrying anode off-gas exiting from the anode reaction chamber of the fuel cell to an anode input side of the fuel cell for return into the anode reaction chamber;
   a burner provided at a vaporizing device and/or to an additional heating device.

10. The fuel cell system according to claim 9, wherein the burner of the vaporizing device and/or the additional heating device are/is supplied with liquefied petroleum gas from the supply of liquefied petroleum gas.

11. Use of a fuel cell system according to claim 1, in a vehicle, wherein a heating device is provided for heating an interior of the vehicle and the heating device comprises an additional heating device.

12. The use of a fuel cell system according to claim 11, wherein the additional heating device is operated with liquefied petroleum gas.

13. The use of a fuel cell system according to claim 11, wherein the fuel cell system serves as an onboard power supply system in a recreational vehicle or as a system for decentralized energy supply.

* * * * *